United States Patent
Hall et al.

(10) Patent No.: US 10,255,463 B2
(45) Date of Patent: Apr. 9, 2019

(54) SECURE COMPUTER ARCHITECTURE

(75) Inventors: William E. Hall, Clinton, CT (US);
Guerney D. H. Hunt, Yorktown Heights, NY (US); Paul A. Karger, Chappaqua, NY (US); Mark F. Mergen, Mount Kisco, NY (US); David R. Safford, Brewster, NY (US); David C. Toll, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 3319 days.

(21) Appl. No.: 12/272,217

(22) Filed: Nov. 17, 2008

(65) Prior Publication Data

US 2010/0125915 A1    May 20, 2010

(51) Int. Cl.
*H04L 12/28* (2006.01)
*G06F 21/85* (2013.01)
*G06F 21/60* (2013.01)

(52) U.S. Cl.
CPC ............ *G06F 21/85* (2013.01); *G06F 21/606* (2013.01)

(58) Field of Classification Search
None
See application file for complete search history.

(56) References Cited

U.S. PATENT DOCUMENTS

| | | | |
|---|---|---|---|
| 4,253,145 A | 2/1981 | Goldberg | |
| 4,456,954 A | 6/1984 | Bullions, III et al. | |
| 5,086,467 A | 2/1992 | Malek | |
| 5,109,522 A | 4/1992 | Lent et al. | |
| 5,757,909 A * | 5/1998 | Park | 380/201 |
| 5,844,885 A * | 12/1998 | Grob et al. | 370/216 |
| 5,944,822 A | 8/1999 | Cornils | |
| 5,966,450 A | 10/1999 | Hosford et al. | |

(Continued)

FOREIGN PATENT DOCUMENTS

| | | |
|---|---|---|
| EP | 0 303 783 B1 | 4/1994 |
| EP | 1 528 474 A2 | 5/2005 |

(Continued)

OTHER PUBLICATIONS

"Security Requirements for Cryptographic Modules", National Institute of Standards' Federal Information Processing Standard (FIPS) Pub 140-2, available at http://csrc.nist.gov/publications/fips/fips140-2/fips1402.pdf, 69 pages.

(Continued)

*Primary Examiner* — John W Hayes
(74) *Attorney, Agent, or Firm* — Stephen J. Walder, Jr.; Rabin Bhattacharya

(57) ABSTRACT

A secure computer architecture is provided. With this architecture, data is received, in a component of an integrated circuit chip implementing the secure computer architecture, for transmission across a data communication link. The data is converted, by the component, to one or more first fixed length frames. The one or more first fixed length frames are then transmitted, by the component, on the data communication link in a continuous stream of frames. The continuous stream of frames includes one or more second fixed length frames generated when no data is available for inclusion in the frames of the continuous stream.

22 Claims, 7 Drawing Sheets

(56) References Cited

U.S. PATENT DOCUMENTS

| | | | |
|---|---|---|---|
| 6,266,704 B1 | 7/2001 | Reed et al. | |
| 6,304,659 B1 | 10/2001 | Gold et al. | |
| 6,327,275 B1* | 12/2001 | Gardner et al. | 370/535 |
| 6,502,135 B1 | 12/2002 | Munger et al. | |
| 6,590,903 B1 | 7/2003 | Hofers et al. | |
| 6,618,761 B2 | 9/2003 | Munger et al. | |
| 6,704,899 B1 | 3/2004 | Dold et al. | |
| 6,715,085 B2 | 3/2004 | Foster et al. | |
| 6,826,616 B2 | 11/2004 | Larson et al. | |
| 6,834,310 B2 | 12/2004 | Munger et al. | |
| 6,851,056 B2 | 2/2005 | Evans et al. | |
| 6,853,686 B1* | 2/2005 | Cupo et al. | 375/259 |
| 6,941,292 B2 | 9/2005 | Gaur et al. | |
| 6,957,335 B2 | 10/2005 | Foster et al. | |
| 7,089,419 B2 | 8/2006 | Foster et al. | |
| 7,117,196 B2 | 10/2006 | Gaur et al. | |
| 7,359,325 B1 | 4/2008 | Lewis et al. | |
| 7,522,606 B1* | 4/2009 | Sendrovitz | 370/394 |
| 7,522,633 B2* | 4/2009 | Ichino | 370/466 |
| 7,545,819 B1* | 6/2009 | Hardie et al. | 370/401 |
| 7,574,737 B1* | 8/2009 | Loh | 726/15 |
| 8,094,562 B1* | 1/2012 | Baumbach et al. | 370/236 |
| 2002/0039211 A1* | 4/2002 | Shen et al. | 359/110 |
| 2002/0041683 A1 | 4/2002 | Hopkins et al. | |
| 2002/0174351 A1 | 11/2002 | Jeong et al. | |
| 2003/0118189 A1 | 6/2003 | Ibi et al. | |
| 2003/0200448 A1 | 10/2003 | Foster et al. | |
| 2004/0103083 A1 | 5/2004 | Gaur et al. | |
| 2004/0107341 A1 | 6/2004 | Hall et al. | |
| 2004/0158744 A1 | 8/2004 | Deng et al. | |
| 2004/0205203 A1 | 10/2004 | Peinado et al. | |
| 2005/0050342 A1 | 3/2005 | Boivie et al. | |
| 2005/0074116 A1 | 4/2005 | Hall et al. | |
| 2005/0076226 A1 | 4/2005 | Boivie et al. | |
| 2005/0097298 A1 | 5/2005 | Cohen | |
| 2005/0108498 A1 | 5/2005 | Kaminaga et al. | |
| 2005/0198492 A1 | 9/2005 | Gaur et al. | |
| 2005/0198498 A1 | 9/2005 | Gaur et al. | |
| 2005/0198500 A1 | 9/2005 | Gaur et al. | |
| 2005/0201554 A1 | 9/2005 | Kramer et al. | |
| 2006/0004944 A1 | 1/2006 | Vij et al. | |
| 2006/0015753 A1 | 1/2006 | Drehmel et al. | |
| 2006/0015754 A1 | 1/2006 | Drehmel et al. | |
| 2006/0015947 A1 | 1/2006 | Conti et al. | |
| 2006/0047953 A1 | 3/2006 | Beukema et al. | |
| 2006/0080553 A1 | 4/2006 | Hall | |
| 2006/0095793 A1 | 5/2006 | Hall | |
| 2006/0174053 A1 | 8/2006 | Anderson et al. | |
| 2006/0206658 A1 | 9/2006 | Hendel et al. | |
| 2006/0206687 A1 | 9/2006 | Vega | |
| 2006/0233149 A1 | 10/2006 | Rustagi et al. | |
| 2006/0259732 A1 | 11/2006 | Traut et al. | |
| 2006/0259734 A1 | 11/2006 | Sheu et al. | |
| 2006/0259769 A1 | 11/2006 | Goettfert et al. | |
| 2006/0259818 A1 | 11/2006 | Howell et al. | |
| 2007/0005856 A1 | 1/2007 | Nakai | |
| 2007/0008324 A1 | 1/2007 | Green | |
| 2007/0016755 A1 | 1/2007 | Pratt | |
| 2007/0136647 A1 | 6/2007 | Kanai et al. | |
| 2008/0273537 A1* | 11/2008 | Meylan et al. | 370/394 |

FOREIGN PATENT DOCUMENTS

| | | |
|---|---|---|
| EP | 1 701 268 A2 | 9/2006 |
| WO | WO 2005/036406 A1 | 4/2005 |

OTHER PUBLICATIONS

Bell, D.E. et al., "Secure Computer System: Unified Exposition and Multics Interpretation", ESD-TR-75-306, Mar. 1976, The MITRE Corporation, Bedford, MA: HQ Electronic Systems Division, Hanscom AFB, MA, available at http://csrc.nist.gov/publications/history/bell76.pdf, 134 pages.

Lampson, Butler W., "A Note on the Confinement Problem", Association for Computing Machinery, Communications of the ACM, 16(10), Oct. 1973, pp. 613-615.

"Department of Defense Dictionary of Military and Associated Terms", Join Publication Jan. 2002, Apr. 12, 2001 (As Amended Through Oct. 17, 2008), Department of Defense: Washington, D.C., http://www.dtic.mil/doctrine/jel/new_pubs/jp1_02.pdf, 780 pagrd (6 pages submitted herewith).

"IBM Virtual Machine Facility/370: Data Areas and Control Block Logic, Release 3, PLC1", IBM Corporation, File No. S370-36, Order No. SY20-0884-0, Feb. 1976, 317 pages.

"IBM Virtual Machine Facility/370: System Logic and Problem Determination Guide vol. 1", IBM Corporation, File No. S370-36, Order No. SY20-0886-1, Mar. 1979, http://www.bitsavers.org/pdf/ibm/370/vm370/SY20-0886-1_vmLogicV1_Mar79.pdf, 455 pages (7 pages submitted herewith).

"Security Requirements for Cryptographic Module", National Institute of Standards (NIST) Federal Information Processing Standard (FIPS) Pub 140-2, http://csrc.nist.gov/publications/fips/fips140-2/fips1402.pdf, 69 pages.

Abramson, Norman, "The Aloha System—Another alternative for computer communications", 1970 Fall Joint Computer Conference, AFIPS Conference Proceedings, vol. 37, AFIPS Press, Montvale, N.J., 1970, pp. 281-285.

Dierks, T. et al., "The TLS Protocol Version 1.0", The Internet Society, 1999, 81 pages.

Dierks, T. et al., "The TLS Protocol Version 1.0", The Internet Society, Jan. 1999, http://www.ietf.org/rfc/rfc2246.txt., 69 pages.

Dierks, T. et al., "The Transport Layer Security (TLS) Protocol Version 1.2", Network Working Group, Aug. 2008, 105 pages.

Dyer, Joan et al., "Application Support Architecture for a High-Performance, Programmable Secure Coprocessor", IBM Corporation, IBM 4758 Cryptographic Coprocessor FIPS Evaluated Product Report, http://csrc.nist.gov/nissc/1999/program/dyer/sld001.htm, 25 pages.

Freier, Alan O. et al., "The SSL Protocol Version 3.0", Transport Layer Security Working Group, Internet-Draft, Nov. 18, 1996, http://www.mozilla.org/projects/security/pki/nss/ssl/draft302.txt, 58 pages.

Hickman, Kipp E., "SSL 0.2 Protocol Specification", Feb. 9, 1995, http://www.mozilla.org/projects/security/pki/nss/ssl/draft02.html, 22 pages.

Karger, Paul A., "Non-Discretionary Access Control for Decentralized Computing Systems", MIT/LCS/TR-179, May 1977, Laboratory for Computer Science, Massachusetts Institute of Technology: Cambridge, MA, http://www.lcs.mit.edu/publications/pubs/pdf/MIT-LCS-TR-179.pdf, 141 pages.

Kent, S. et al., "Security Architecture for the Internet Protocol", ISPEC, RFC-2401, The Internet Society, 1998, http://rfc.net/rfc2401.html, 68 pages.

Murdoch, Steven J., "Covert channel vulnerabilities in anonymity systems", UCAM-CL-TR-706, Dec. 2007, Computer Laboratory, University of Cambridge: Cambridge, England, http://www.cl.cam.ac.uk/techreports/UCAM-CL-TR-706.pdf, 140 pages.

Padlipsky, M.A. et al., "Limitations of End-to-End Encryption in Secure Computer Networks", ESD-TR-78-158, Aug. 1978, The MITRE Corporation: Bedford, MA, HQ Electronics Systems Division: Hanscom AFB, MA, http://stinet.dtic.mil/cgi-bin/GetTRDoc?AD=A059221&Location=U2&doc=GetTRDoc.pdf, 13 pages.

Wang, Zhenghong et al., "Covert and Side Channels due to Processor Architecture", Proceedings of the 22nd Annual Computer Security Applications Conference, Dec. 11-15, 2006, Miami Beach, FL, IEEE Computer Society, http://www.acsac.org/2006/papers/127.pdf, pp. 473-482.

Wang, Zhenghong et al., "New Cache Designs for Thwarting Software Cache-based Side Channel Attacks", Proceedings of the 34th Annual International Symposium on Computer Architecture (ISCA), Jun. 9-13, 2007, ACM, pp. 494-505.

* cited by examiner

SECURE COMPUTER ARCHITECTURE

BACKGROUND

The present application relates generally to an improved data processing apparatus and method and more specifically to a secure computer architecture.

One of the most important considerations of any computer architecture is the security of the computer architecture. One of the most difficult security attacks that a computer architecture can defend against is a physical attack where an attacker has physical access to the data processing device in which the computer architecture is utilized. With physical access, the attacker can perform active and passive attacks on the data whenever it is exposed. This includes exposure in the data flows between the central processing unit (CPU) and memory, storage, and network devices. Even if this data is encrypted, the encryption keys and thus, the clear data, can often be recovered through passive attacks, such as side channels, and through active attacks, such as covert channel Trojans and man in the middle data manipulation.

In a covert channel attack, a malicious program with access to sensitive information tries to convey this information to another party in violation of access control policies and mechanisms. The term "covert channel" describes any mechanisms used to bypass a security policy, such as a security policy that would prevent passing data from high security to low security elements. In the Bell and LaPadula model, described in Bell et al., "Secure Computer System: Unified Exposition and Multics Interpretation," ESD-TR-75-306, March 1976, The MITRE Corporation, Bedford, Mass.: HQ Electronic Systems Division, Hanscom AFB, MA., available at http://csrc.nist.gov/publications/history/bell76.pdf, one is not allowed to pass information from higher security processes to lower security processes. The term "covert channel" also applies to privacy related data such as private information a client system may have that the owner does not want to leak to other systems on the internet and to sensitive data like encryption keys (see Lampson, B. W., "A Note on the Confinement Problem." Communications of the ACM, October 1973. 16(10): p. 613-615).

There are many potential covert channel mechanisms. The two major categories of covert channel mechanisms include storage channels, which operate by modifying a stored object to communicate data, and timing channels which operate by affecting the relative timing of events to transmit information. Covert channel attacks inherently involve a malicious user or program with access to sensitive information attempting to transmit the sensitive information to a user or program without such access.

With side channels, in contrast, there exist inadvertent leaks which do not depend on a malicious sender, but which exist as a side effect of the system itself. Many different types of side channel attacks have been shown to be practical including:

Timing attacks—attacks based on measuring how much time various computations take to perform;
Architectural side-effect attacks—attacks which take advantage of side-effects of performing a computation on a particular machine architecture, such as evicting cache lines, and branch prediction time;
Power monitoring attacks—attacks which make use of varying power consumption by the hardware during computation;
TEMPEST (a.k.a. van Eck or radiation monitoring attacks—attacks based on leaked electromagnetic radiation which can directly provide plaintexts and other information;
Light leakage attacks—for example, many networking devices have traffic LEDs which accurately leak the actual data to observers;
Acoustic cryptanalysis attacks—attacks which exploit sound produced during a computation; and
Traffic flow analysis attacks—attacks which gain information by watching data flow between devices, such as between memory and processors, or CPU to CPU.

As it turns out all of these side channels can also be used by a sophisticated Trojan as a covert channel mechanism.

In a timing attack, sensitive information, such as keys of RSA, DSS, and other crypto systems can be compromised by measuring the execution time of the overall cryptographic operation. This attack requires an attacker to be able to simulate or predict the timing behavior of the attacked device rather accurately. The time taken to do the cryptographic operation inadvertently leaks information about the keys.

Similarly, the power consumed by a cryptographic device can be analyzed during the processing of the cryptographic operation. The power consumption turns out to include deterministic data-dependent parts which can be exploited by simple power analysis and differential power analysis. Traffic flow analysis can learn information about the data, even if it is encrypted, by watching the flow of the data between systems.

Data security within a computer system has been attempted in several prior systems. One approach has been to encapsulate the entire computer in a protective wrapper that is tamper resistant or tamper responsive, so that the attacker cannot gain physical access to the internal data flows. National Institute of Standards' Federal Information Processing Standard (FIPS) PUB 140-2, "Security Requirements for Cryptographic Module" (available at csrc.nist-.gov/publications/fips/fips140-2/fips1402.pdf) and other publications in the NIST's FIP-140 series of publications, describe such tamper resistance methods and standards for cryptographic processing devices. While such techniques are feasible for preventing physical access, the necessary encapsulation is very expensive and does not scale well due to thermal conduction issues as well as maintenance issues for large scale systems.

SUMMARY

In one illustrative embodiment, a method, in a data processing system, is provided. The method may provide secure inter-chip data communication links within the data processing system. The method may comprise receiving, in a component of the integrated circuit chip, data to be transmitted across a data communication link and converting, by the component, the data to one or more first fixed length frames. The method may further comprise transmitting, by the component, the one or more first fixed length frames on the data communication link in a continuous stream of frames. The continuous stream of frames may include one or more second fixed length frames generated when no data is available for inclusion in the frames of the continuous stream.

In other illustrative embodiments, a computer program product comprising a computer recordable medium having a computer readable program recorded thereon is provided. The computer readable program, when executed on a component of a computing device, causes the component to receive data to be transmitted across a data communication link and convert the data to one or more first fixed length frames. The computer readable program further causes the component to transmit the one or more first fixed length frames on the data communication link in a continuous stream of frames. The continuous stream of frames includes one or more second fixed length frames generated when no data is available for inclusion in the frames of the continuous stream.

In yet another illustrative embodiment, an integrated circuit chip is provided that comprises at least one processor core, a switch/router coupled to the at least one processor core, a data communication link coupled to the switch/router, and a secure link module coupled to the data communication link and the switch/router. The secure link module receives data to be transmitted across a data communication link from the at least one processor via the switch/router. The secure link module further converts the data to one or more first fixed length frames and transmits the one or more first fixed length frames on the data communication link in a continuous stream of frames. The continuous stream of frames includes one or more second fixed length frames generated when no data is available for inclusion in the frames of the continuous stream.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a processor architecture which provides hardware level protection against various classes of sophisticated covert channel and side channel attacks. The architecture provides protections against such attacks even when the attacker has physical access to the system and its internal components.

The processor architecture of the illustrative embodiments may be implemented in any multi-core microprocessor. For purposes of illustration, the illustrative embodiments will be described with regard to International Business Machines' Secure Processor Architecture™ available from International Business Machines (IBM) Corporation of Armonk, N.Y. A chip with IBM's Secure Processor Architecture™ is only used as one example of a multi-core microprocessor in which the exemplary aspects of the illustrative embodiments may be implemented. It should be appreciated that many modifications to the depicted multi-core microprocessor architecture may be made without departing from the spirit and scope of the illustrative embodiments.

Figure 1:
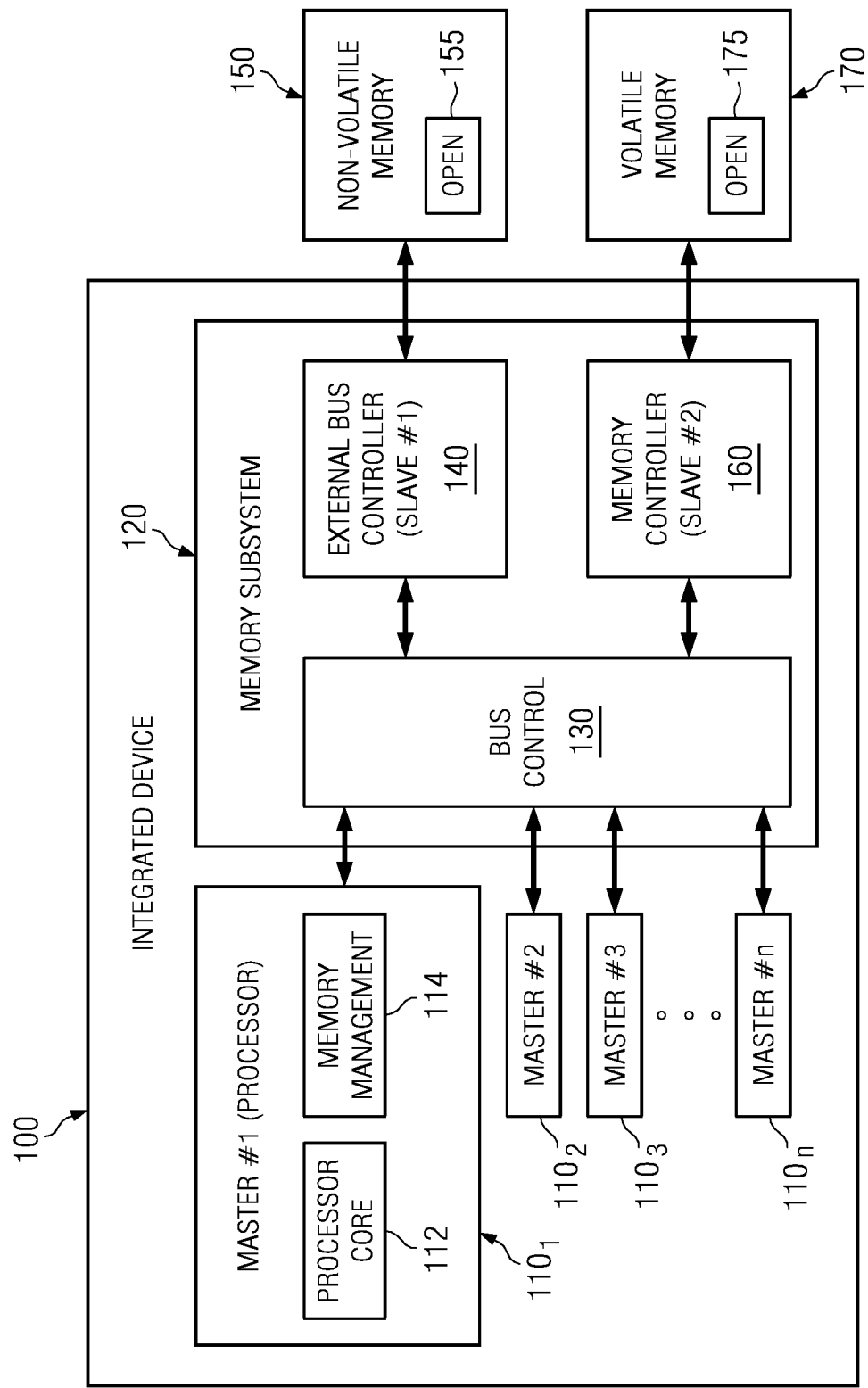
FIG. 1 is an example diagram depicting a conventional integrated device.

FIG. 1 depicts a conventional integrated device, generally denoted 100, having multiple internal functional masters $110_1$, $110_2$, $110_3$ . . . $110_n$. Master $110_1$ is shown as a processor, having a processor core 112 and a memory management unit 114. Internal masters $110_1$, $110_2$, $110_3$ . . . $101_n$ connect in this example to a memory subsystem 120, which includes bus control logic 130 of a shared bus. Those skilled in the art will understand that although shown within the memory subsystem, bus control 130 could alternatively reside outside of subsystem 120.

Bus control unit 130 coordinates and consolidates requests to slaves in the integrated device. For example, a first slave might comprise an external bus controller 140 which is connected to an external non-volatile memory 150, such as flash memory, having an open memory portion 155. A second slave, memory controller 160 connects to external volatile memory 170, such as SDRAM or DRAM. Memory 170 includes an open memory portion 175. In general, functions share a common memory pool in this integrated design in order to minimize memory costs, and to facilitate transfer of data between functions. As such, all internal masters have equal access to both non-volatile and volatile memory, and both storage spaces are labeled open, meaning that there are no limits on data access.

Typically, non-volatile memory is used for persistent storage, wherein data should be retained even when power is removed. This memory may contain the boot code, operating code, such as the operating system and drivers, and any persistent data structures. Volatile memory is used for session oriented storage, and generally contains applications, application data, as well as data structures of other masters. Since volatile memory is faster than non-volatile memory, it is common to move operating code to volatile memory and execute instructions from there when the integrated device is operational.

Note that in a typical system such as presented in FIG. 1, there are several security risks: (1) the behavior of the processor can be controlled by modifying the operating code or data structures, and internal data or operation can be compromised; (2) in certain cases, such as a communication controller, etc., an internal master can be controlled by an external source, and can be used to compromise internal code or data since memory is shared; (3) debug and development tools that are used in software development can be used to modify or monitor the processor's behavior; and (4) a given master can unintentionally corrupt or compromise the operation of another internal master since memory is shared.

The IBM Secure Processor Architecture™ addresses these security risks by providing an access control function disposed within the data path between the bus control and the slave devices. This access control function can use characteristics of the internal bus that connects the functional masters to the slave devices to allow each request for access to be further qualified based on a set of secure control information, and if desired, to be prevented. Advantageously, this access control function provides the ability to differentiate accesses by which master is making the data request, as well as where the data is stored, and then to either grant or limit access accordingly, or to otherwise qualify the access. Additional access control functionality is also described herein in accordance with other aspects of the present invention.

Figure 2:
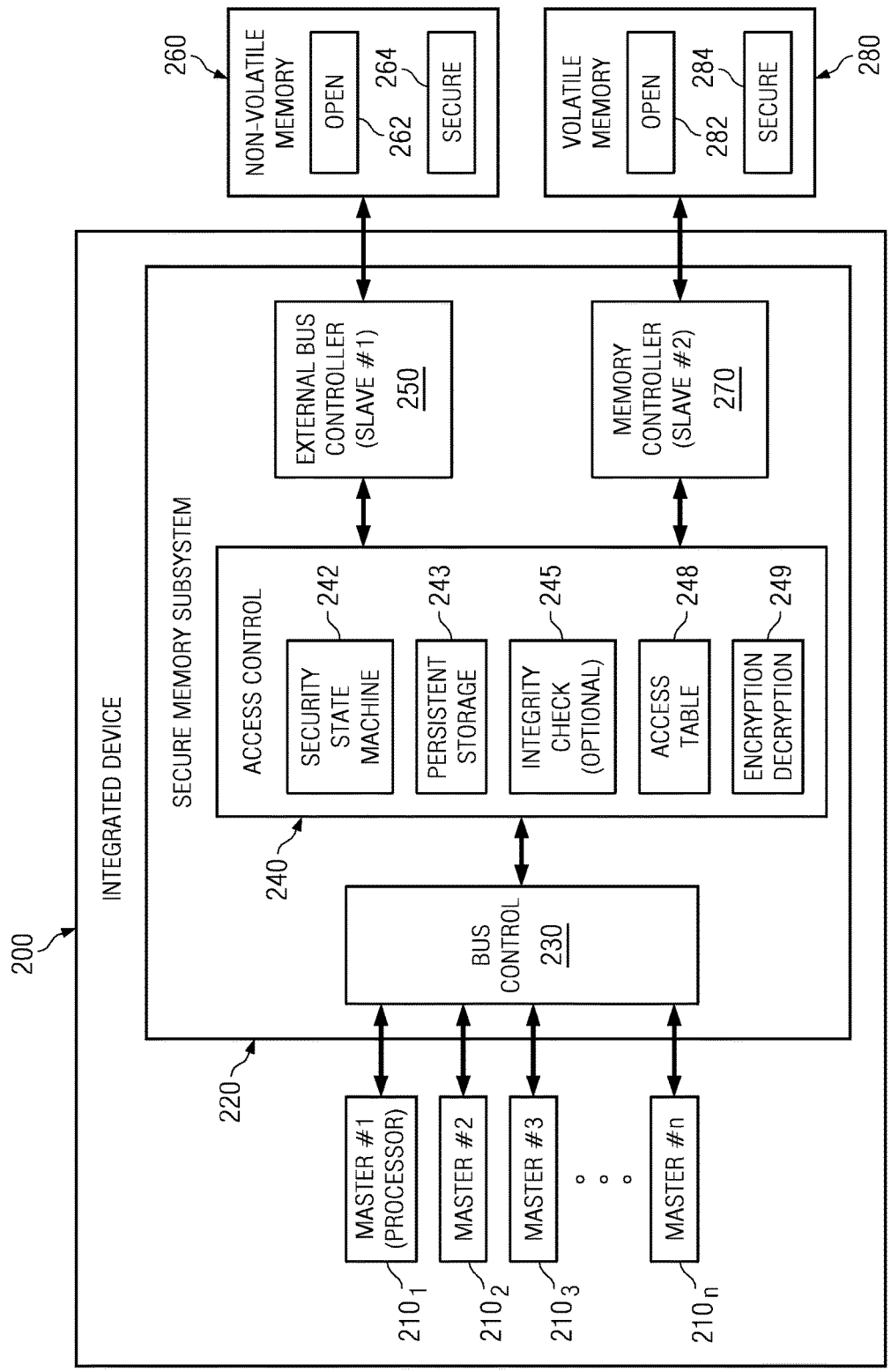
FIG. 2 illustrates one example embodiment of a secure processor architecture.

FIG. 2 illustrates one embodiment of the IBM Secure Processor Architecture™, generally denoted 200, which includes an access control function 240. System 200 again includes multiple functional masters $210_1 \ldots 210_n$ which communicate via a bus control 230 with one or more slaves 250 and 270. In this case, access control function 240 intercedes in the data path between bus control 230 and slaves 250 and 270. As an alternative embodiment the external bus controller, 250 and/or the memory controller, 270 could reside outside of the secure memory subsystem unit. As an alternate embodiment, bus control unit 230 could reside outside of the secure memory subsystem unit. As shown, a first slave device comprises an external bus controller 250, and a second slave device comprises a memory controller 270. In this context, the combination of the bus control unit 230, access control unit 240, external bus controller 250, and the memory controller 270 form the secure memory subsystem 220. As a result, the external address space defined as non-volatile memory 260 and volatile memory 280 can be further divided into open area 262 and secure area 264, as well as open area 282 and secure area 284, respectively. In this use, "secure" implies that masters $210_1 \ldots 210_n$ can only access a space as defined in the access control unit 240. Note that the access control function controls all accesses to both open and secure areas and decides whether or not to apply encryption/decryption 240 to the memory being accessed. If the access request is for secure memory 264 or 284 then encryption/decryption is applied, and if the access request is for open memory 262 or 282 the encryption/decryption is not applied.

Briefly described, a request from a master, e.g., master $210_1$, granted control by the bus control unit 230 is sent to the access control unit 240, along with the requested address and associated controls (e.g., read or write, etc.). The access table is used by the access control function 240 to compare the requested address, master id, and read or write indicator to a definition of allowed access capability for that master 210. The given request can either be blocked (terminated), allowed in the clear, or allowed with encryption/decryption. If the requested transfer is allowable, then the bus signals are propagated to the slaves, and access parameters associated with the request based on the access table are sent to the encryption/decryption engine 249, i.e., if encryption/decryption is applicable. The encryption/decryption engine 249 can be used to encrypt write data as the data is transferred to a given slave, or decrypt read data as the data is returned from a given slave using the associated access parameters.

In addition to the functions of qualifying data access based on the requesting master id and the address of the request, a security state machine 242 is added to the access control function 240 to, for example, control operation of the access table 248 and encryption/decryption function 249. On-chip storage 243 is also used in conjunction with the security state machine 242 to hold a substitute boot address 245 and a master key set 246. This storage is persistent in that values are retained even when general power is removed. As a result, once initialized, these values can be used from session to session until specifically reset or erased with a change in security state.

The security state machine 242 of the data access control function 240 can be in one state of multiple possible security states, including a null state and a secured state. In the secured state, the control function replaces a standard boot code address associated with the request for boot code with a substitute boot code address. The substitute boot code address addresses an encrypted version of boot code, which is then decrypted by the control function employing a master key set held in the persistent storage. When in the null state, the master key set is erased.

As a further enhancement of the above-described data access control function 240, a control capability to selectively authenticate requested data is added. This selective authentication can be transparent to the functional master of the integrated device initiating the data request. The requested data can either comprise code or data that is stored in encrypted form in external memory. While the encryption capabilities of the above-described data access control function prevent direct observation and modification of data, the integrity check function adds the ability to further verify that the encrypted value is the same value that was written to memory originally.

In one embodiment of the IBM Secure Processor Architecture™, an integrity check function 245 works in conjunction with an access table and access parameters. Address ranges that are to be associated with authenticated data can be indicated by an additional parameter in the access table. The integrity check function 245 determines the location of integrity values in memory based on the requested data transfer, and also calculates and compares the integrity values. Briefly summarized, the processes can be divided into pre-storage and post-storage steps, for example:

Pre-Storage

Generate a first integrity check value which is a mathematically condensed version of the data to be secured and authenticated; encrypt the data and encrypt the first integrity check value; store the encrypted integrity value; and store the encrypted data in memory.

Post-Storage

Retrieve and decrypt the integrity value, and retrieve and decrypt the encrypted data from memory; generate a second integrity check value using the same function as employed in generating the first integrity check value; compare the first and second integrity check values; if they match, the data is authenticated; otherwise, the data has been corrupted and corrective action should be taken.

While the IBM Secure Processor Architecture™ provides encryption and authentication of data between chips in a computer system, such as from CPU to memory, the encryption and authentication is similar to network end-to-end encryption schemes. Such network end-to-end encryption schemes, e.g., IPSEC, SSL, etc., fail to provide traffic flow security since the routing, size, and timing information for the data remains in the clear.

Moreover, current multi-core microprocessors are designed with a point-to-point interconnect as the inter-chip fabric. This interconnect is typically always on so that synchronization may be maintained. Memory controllers and other controllers are on-chip with more conventional buses to the outside world exposing function, address, and data. The mechanisms of the IBM Secure Processor Architecture™ protect the data but not the function and address. Allowing observation of the function and/or address, consequently, an adversary can do traffic analysis which is sufficient to discover keys and/or secrets under control of the software. In other words, with the IBM Secure Processor Architecture™, there may still be some vulnerability to addressing, data size, and data timing information to covert and side channel analysis.

The illustrative embodiments improve upon the IBM Secure Processor Architecture™ by providing a processor architecture which can provide full protection against traffic flow analysis attacks on the inter chip links using hardware encryption in a high speed chip-to-chip environment. The illustrative embodiments cryptographically protect the function, address, and data for all information external to a chip, multi-chip module, or the enclosure. This is achieved by modifying the inter-chip fabric to utilize secure links. As described in greater detail hereafter, these secure links are always active with fixed size frames and no visible routing information. These secure links always send a fixed length encrypted frame, even when no data is available. Thus, it is not possible for an interloper to monitor the traffic, such as by way of a covert or side channel, to determine the function, address, and data information even if the interloper has physical access to the processor since there is no variation in the data traffic. While the illustrative embodiments improve upon the IBM Secure Processor Architecture™, it should be appreciated that the encryption engine provided in IBM's Secure Processor Architecture™ can be used in conjunction with the other mechanisms of the illustrative embodiments as the encryption engine for the secure links described herein.

Figure 3:
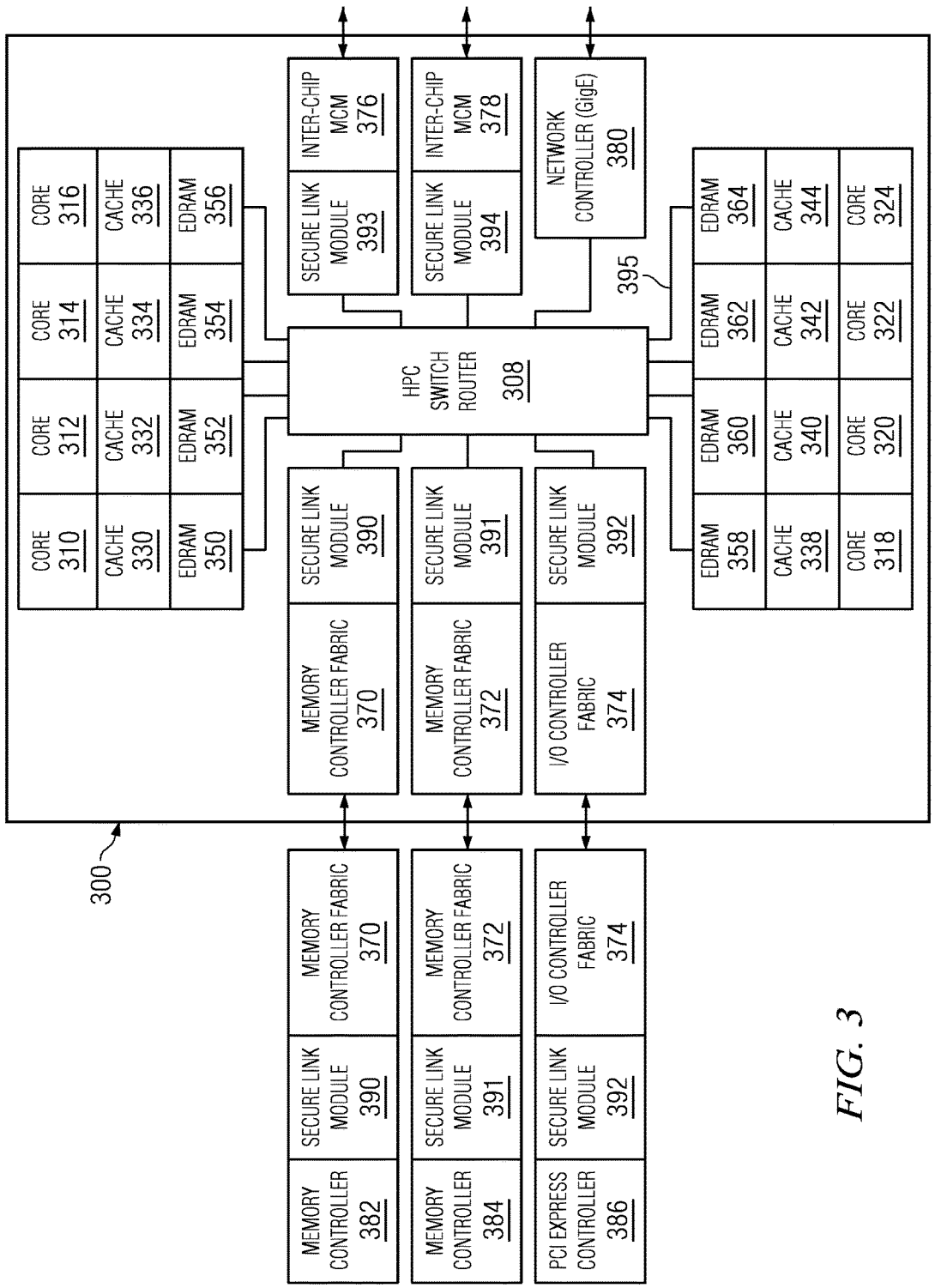
FIG. 3 is an example block diagram of a secure processor architecture in accordance with one illustrative embodiment.

FIG. 3 is an example block diagram of a secure processor architecture in accordance with one illustrative embodiment. As is shown in FIG. 3, the secure processor 300 has a plurality of cores or processors 310-324 with associated caches 330-344 and EDRAM 350-364. In addition, the secure processor 300 includes memory controller fabrics 370 and 372, input/output (I/O) controller fabric 374, inter-chip intra MCM module 376, inter-chip inter MCM module 378, a high performance computing (HPC) switch router 308, and network controller 380, e.g., a GigE (Gigabyte Ethernet) controller. The memory controller fabrics 370 and 372 are coupled to the respective memory controllers 382 and 384 via secure link modules 390 and 391 external to the secure processor 300. The I/O controller fabric 374 is coupled to one or more I/O controllers, represented collectively in FIG. 3 as a single Peripheral Component Interconnect (PCI) Express controller 386, via secure link module 392. The inter-chip intra MCM module 376 provides communications with other processor chips within the same MCM. The inter-chip inter MCM module 378 provide communication with other processor chips between Multi Chip Modules (MCM). Both of these modules 376 and 378 provide communications between processor chips so that, even though there are differences, such as speed, between the fabrics used to connect intra MCM and inter MCM, hereafter these are referred to as "inter-chip modules" for simplicity. The secure link module is independent of the interconnect fabric. The HPC switch router 308 controls the delivery of data packets to components of the secure processor device 300.

The high performance multi-core chip of the secure processor device 300 has an interconnect fabric that is used to connect the functional modules within the chip. This intra-chip fabric can be implemented as a switch, such as HPC switch router 308, a bus, a ring, or in some other appropriate manner. If the chip of the secure processor device 300 is designed to be incorporated into a multi-chip solution, the interconnect fabric, however it is implemented, also incorporates the function of a router so that packets can be sent to all parts of any resulting multi-chip solution.

Secure link modules 390-394 are provided in association with memory controller fabrics 370-372, I/O controller fabric 374, and inter-chip modules 376 and 378, within the secure processor 300 and memory controllers 382-384 and PCI-Express controller 386 external to the secure processor 300. It should be noted that the network controller 380, e.g., a GigE controller, does not have an associated secure link module. This is because the network controller 380 is considered to not violate the security domain because all traffic is assumed to be coming out of the network controller 380 is protected using standard network security protocols, such as IPSec or SSL.

Normal point-to-point links used as high speed interconnects between chips, or cores within a single chip, are always active to maintain clock and bit synchronization. These links typically send varying sized packets with visible routing information, i.e. non-encrypted routing information. However, with the illustrative embodiments, the secure link modules 390-394 operate to make these links always active with fixed sized frames and no visible routing information. In one illustrative embodiment, the inter-chip fabric 376 and 378 is unchanged from known multi-core architectures but with the secure link modules 393-394 automatically converting all data packets to the proper fixed length encrypted frames. In an alternative embodiment, the intra-chip fabric may be modified to send fixed length packets. Moreover, the secure link modules 390-397 are configured so that they always send a fixed length encrypted frame even when no data is available. This causes the links to not have any variations in traffic so that it is not possible to extract secure information from traffic analysis.

The HPC Switch Router 308 has the ability to route data (packets) to all components that are part of the secure processor 300. For example, in a system where there are multi-chip modules (MCMs), each MCM may have four CPU chips and each CPU chip may have eight or sixteen CPU core complexes. Each of the CPU chips has an HPC switch router 308 that does the routing to get to inter-chip traffic routed to the correct memory controller 382-384, I/O controller 386, etc. A typical packet of data contains type information (or function information), source information, destination information, address information, and a data payload with optional tags (tags active). The HPC switch router 308 determines which link to place each packet on to get it to the ultimate destination. The packet is encrypted before it leaves the secure processor chip 300. If an MCM with tamper detecting/responding mesh or enclosure is utilized, then the intra MCM links can be configured to not do encryption. If a MCM is utilized that does not have such a mesh or enclosure, then encrypted intra MCM links should be utilized just like the inter MCM links.

The secure link modules 390-397 automatically format data being sent across inter-chip links into a frame of a fixed length as mentioned above. In one illustrative embodiment, the inter-chip frame has a start of frame indicator (SOF), a fixed length frame, CRC, and end of frame indicator (EOF). The fixed length frame has a monotonically increasing frame number and the encrypted data. The inter-chip fabric receives the fixed length frame from the secure link module and adds the SOF, CRC, and EOF as required. For example, in one illustrative embodiment, the frame number is a 64 bit monotonically increasing counter and there are two data packets each with a destination address, followed by an integrity value for the assembled data block in the frame.

In FIG. 3, the I/O controllers are represented by the PCI-Express controller 386. The secure link module can be use to secure the I/O. All traffic between the processor chip 300 and the external I/O controller 386 is protected by secure link modules 392.

As mentioned above, the secure link modules 390-394 send out a constant stream of frames on the links even when there are no data packets. A data block may be filled with dummy data, e.g., all 1s, all 0s, or a random value, when there is insufficient data to populate the data block portion of the fixed length frame. Those of ordinary skill in the art, in view of the present description, will understand how to fill in gaps between packets with markers that will be understood not to be valid packets. This makes it impossible for traffic analysis to determine any information from the frame traffic since there is no variation in the traffic. The non-repeating frame number changes with each frame transmitted such that even the frames or packets that do not have actual useful data will have a valid non-repeating frame number.

In one illustrative embodiment, the non-repeating frame number may be a monotonically increasing counter which simplifies the detection of an adversary trying to replay old valid frames. The non-repeating frame number is used to vary the result of the encryption so that, even if the same value is transmitted, the encrypted output is unique. As described in detail in FIG. 6 hereafter, each secure link module has transmit and receive keys. The non-repeating frame number is combined with the transmit key during the encryption process of the frame. Since the communications partner has the same key and frame number, it can successfully decrypt the frame. If the data block of a decrypted frame contains the previously mentioned fill values between data packets, these are discarded. The valid data packets are passed onto the HPC switch router 308 or the local controller.

Figure 4:
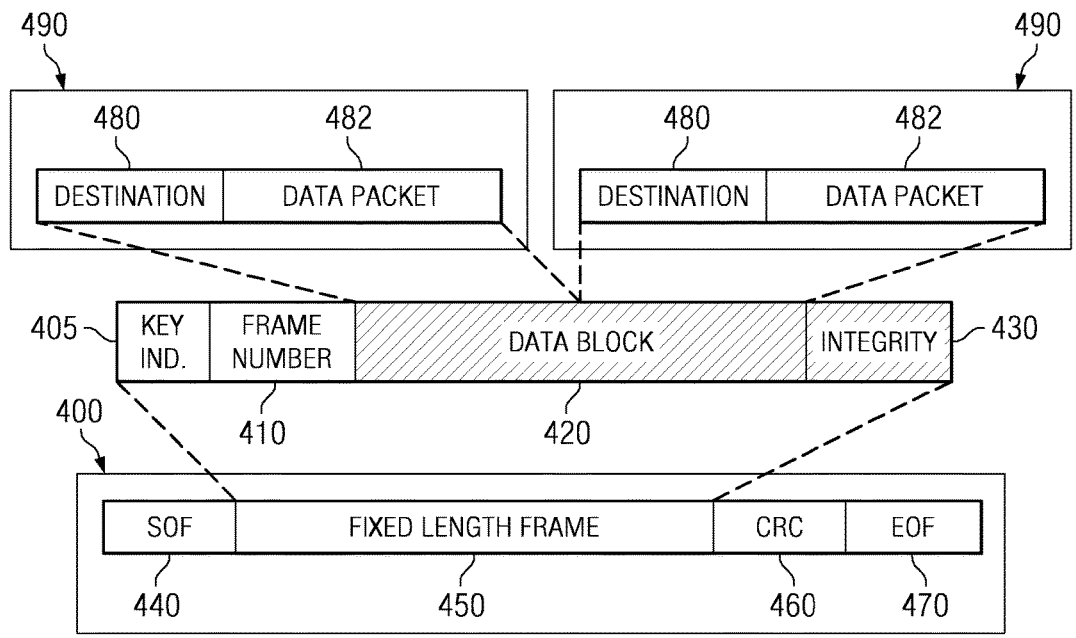
FIG. 4 is an example diagram of a fixed size frame that may be used with the secure links of the illustrative embodiments.

Thus, by ensuring that each frame has the same fixed length and that there is a constant stream of frames on the links, the secure link modules 390-394 ensure that traffic analysis based attacks cannot differentiate one frame from the next and thus, cannot determine information by identifying traffic patterns. Such protections are effective even against physical attacks where the interloper has physical access to the system FIG. 4 is an example diagram of a fixed size frame that may be used on an interconnect fabric of a secure processor architecture in accordance with one illustrative embodiment. As shown in FIG. 4, the frame 400 includes a start of frame indicator (SOF), 440, fixed length frame 450, CRC 460, and end of frame indicator (EOF) 470. The SOF, CRC, and EOF are added if required by the interconnect fabric. In FIG. 3, inter-chip modules 376 and 378, memory controller interconnect fabric 370 and 372, and an I/O controller interconnect fabric 374 are depicted. Each of these interconnect fabrics may have different fixed length frames and interconnect protocols. The secure link modules 393, 394, 370, 372, and 374 supply a frame of the appropriate length for transmission on the interconnect fabric with which they are associated.

The fixed length frame 450 portion of the fixed size frame contains the key indicator 405, the non-repeating frame number 410, a data block 420, and integrity information 430. As indicated in FIG. 4 the data block and integrity are encrypted as a single block. The data block 420 contains one or more data packets 490 each of which has a destination address 480 and an associated data packet 482. For this illustrative embodiment the contents of a data packet may contain, for example, a source address and other information that helps the recipient respond. The secure link module places no constraints on the protocols used by the two ends. The placement of the modules as indicated in FIG. 3 means that no routing or protocol information is exposed, i.e. unencrypted, on the interconnects.

The secure link module generates the frame number 410 by utilizing any of a number of appropriate operations, e.g., either incrementing a monotonic increasing counter, stepping though a pseudo random sequence, or the like. The secure link modules further combines the available data packets 482 and, if necessary, includes fill material into a data block 420, as previously described above. Moreover the secure link module generates the integrity information 430 associated with the assembled data block 420 and encrypts the data block 420 and integrity information 430 as a single block utilizing the frame number in combination with the appropriate key. The secure link module then passes the fixed length frame containing the key indicator 405, the frame number 410, and encrypted combination of the data block 420 and integrity information 430 to the interconnect fabric as the payload to be sent to the partner module. It is important to note that at this point in the architecture the HPC switch router 308 has already routed all the data packets toward the correct secured links. Consequently, the destination 480 may be encrypted because it is not needed until after the packet reaches the other end of the secured link. In this illustrative embodiment, the secured links are always active and therefore, if there is no data or insufficient data, the secure link module 390-394 will generate appropriate fill values for the unused part of the frame being transmitted. The overall data packet or frame has a fixed size regardless of the amount of data to be transmitted. By having a fixed size, it is not possible for traffic analysis based attacks to differentiate one packet from the next in a stream of continuous packets being sent across a link.

The function of the secure link module can be understood as three asynchronous concurrent functions: a transmit loop, a receive loop, and a key negotiation loop. These functions are independent for each link, so that all of the links in the system use unique keys. This is done to assure that data packets, if forwarded through multiple HPC switches 308 and links, will not show up as a recognizable pattern on each of the multiple links.

Figure 6:
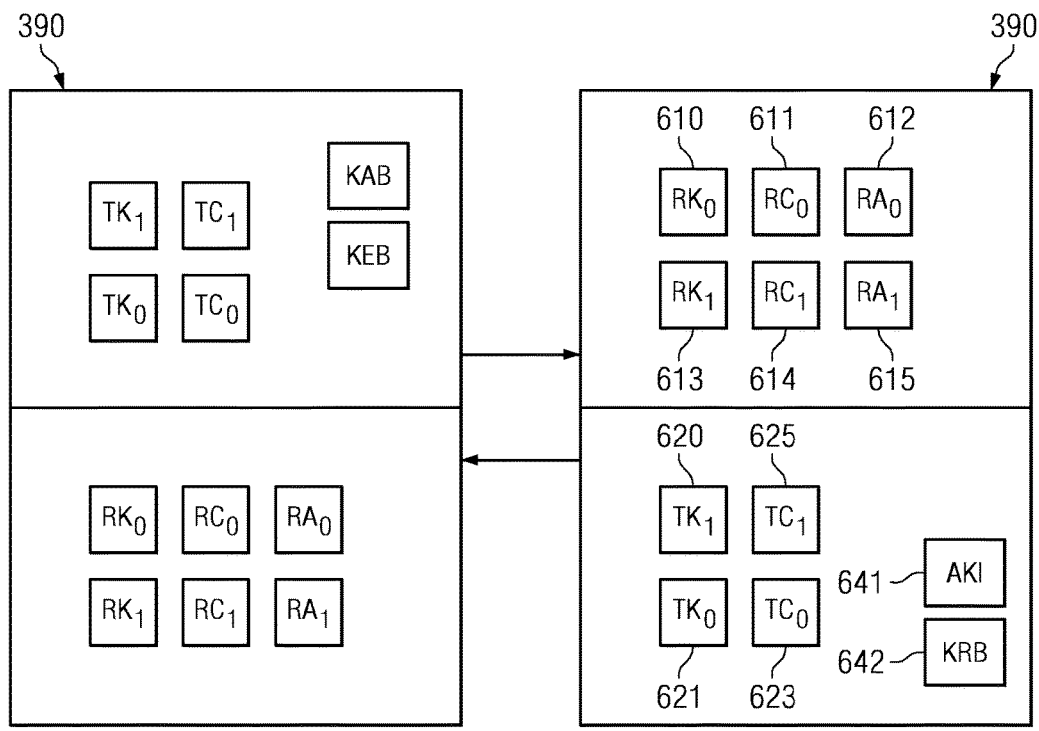
FIG. 6 is an example diagram of how two secure links are connected over an arbitrary interconnect fabric in accordance with one illustrative embodiment.
Figure 5:
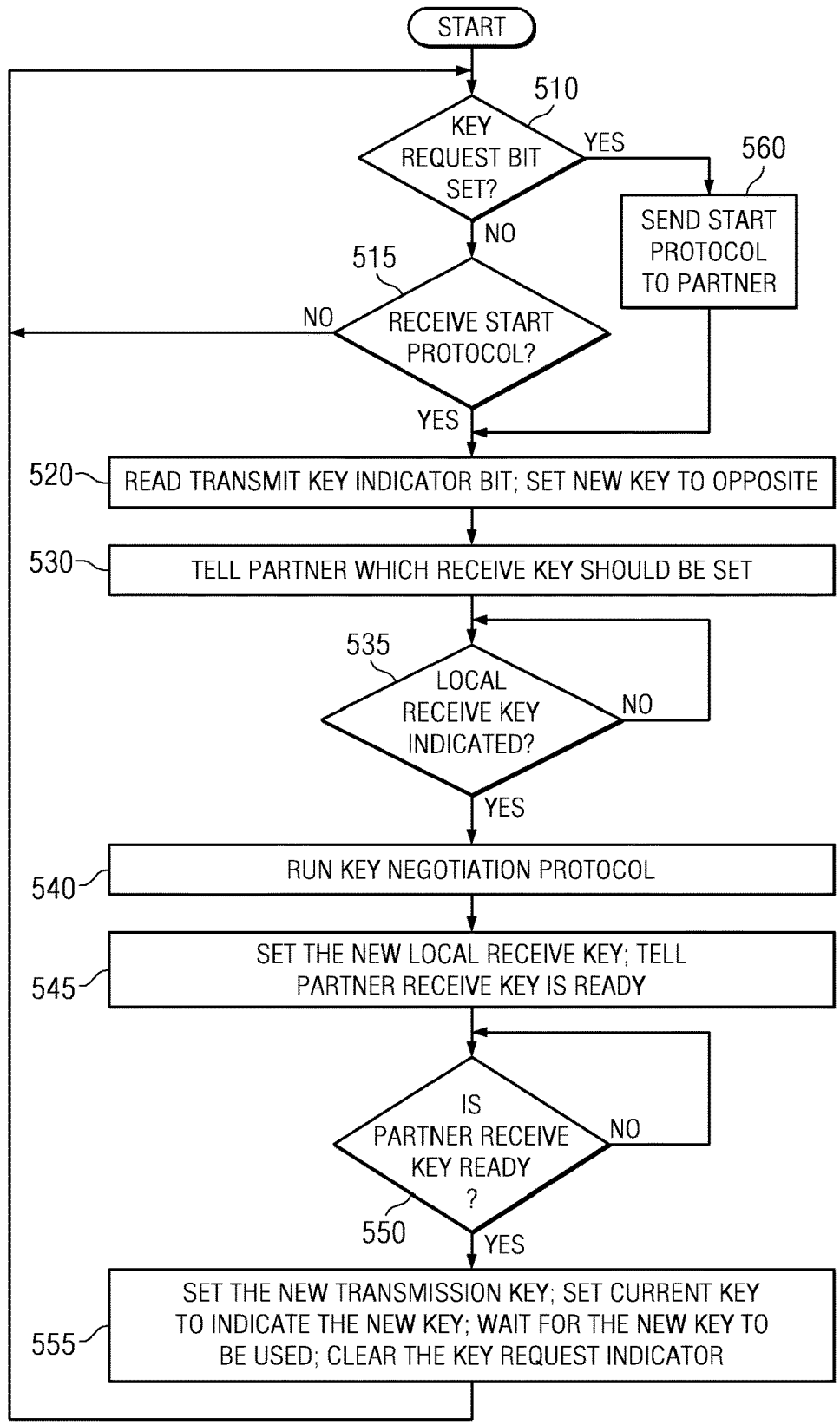
FIG. 5 is an example flowchart outlining a key negotiation protocol operation used between two secure links in accordance with one illustrative embodiment.
Figure 7:
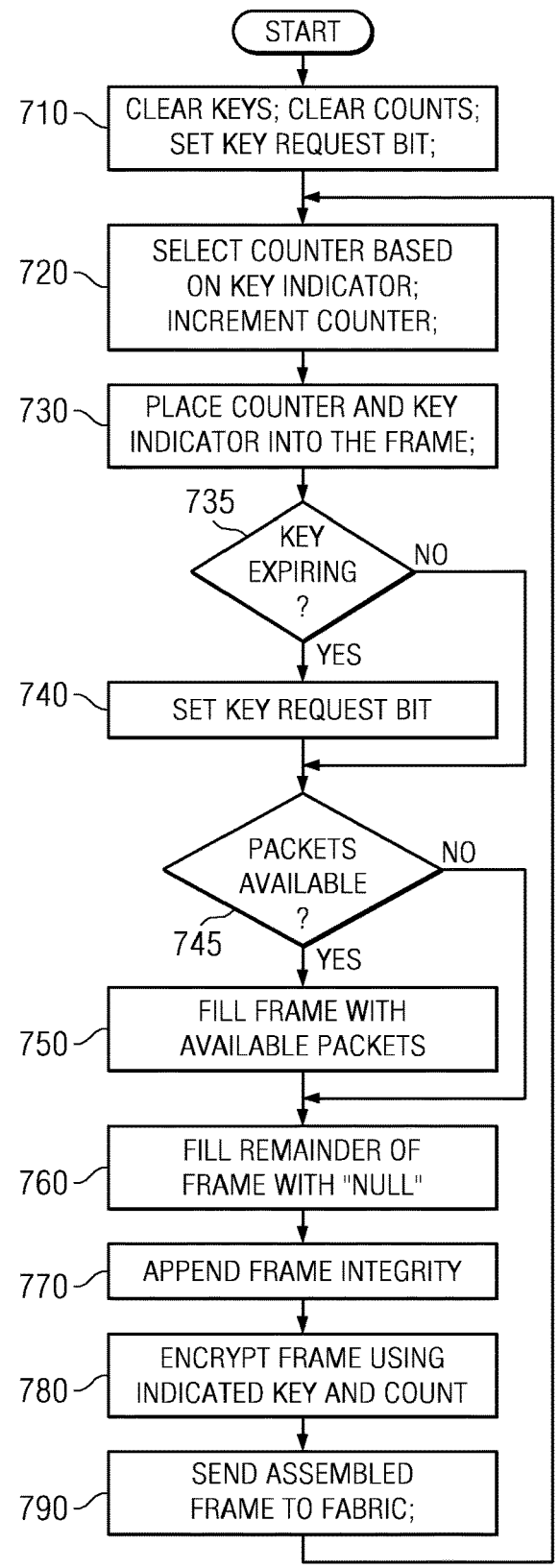
FIG. 7 is an example flowchart outlining a transmit operation of a secure link module in accordance with one illustrative embodiment.
Figure 8:
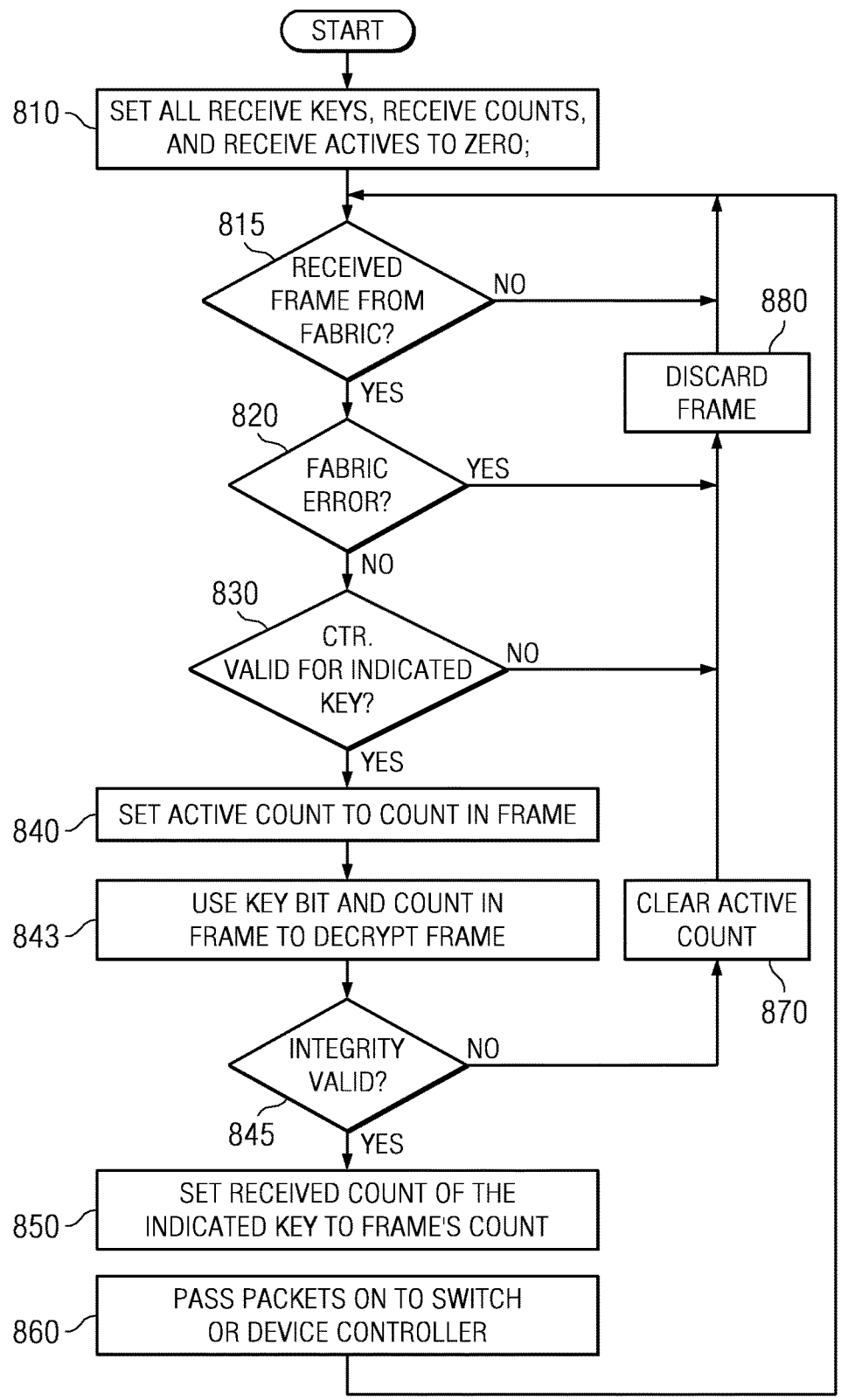
FIG. 8 is an example flowchart outlining a receive operation of a secure link module in accordance with one illustrative embodiment.

In order to secure a link there are two secure link modules connected to one another. The transmit side of one secure module is connected to the receive side of the other as indicated in FIG. 6, described hereafter. FIGS. 5, 7, and 8 describe the three functions of the secure link module utilizing a two way key negotiation protocol example. This assumes that there is some intelligence, such as a processor core on the other side. Secure links can be implemented with less intelligent devices by utilizing a one-way key establishment protocol. In the illustrative embodiment, the key negotiation protocol is driven by the transmit portion of the secure link modules. Those of ordinary skill in the art, in view of the present description, will recognize that one can also utilize two independent protocol cycles, each driven by the transmitter in a secure link module. In the present illustrative embodiment, two keys are utilized that are alternatively changed. Consequently, the illustrative embodiment only needs a one bit key indicator to indicate which key is active. Other implementations may use as many keys as desired, with an associated key indicator as long as the keys that are used serially, where the selection of the key is not associated with any characteristics of the data being transmitted.

FIG. 5 is an example flowchart outlining a key negotiation protocol operation used between two secure links in accordance with one illustrative embodiment. It will be understood that each block of the flowchart illustration, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks. Such a storage medium may be, for example, firmware of one or more hardware devices in a chip or multi-chip module.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Furthermore, the flowchart is provided to demonstrate the operations performed within the illustrative embodiments. The flowchart is not meant to state or imply limitations with regard to the specific operations or, more particularly, the order of the operations. The operations of the flowchart may be modified to suit a particular implementation without departing from the spirit and scope of the present invention.

The operation outlined in FIG. 5 may be implemented, for example, by a negotiation mechanism of a secure link module implementing a negotiation protocol in accordance with one illustrative embodiment. As shown in FIG. 5, the secure link module key negotiation operation starts by checking to see if the key request bit is set (step 510). If a key is requested, the secure link module sends a start key negotiation protocol indication (step 560) to the secure link module's partner, i.e. a secure link module at the receiver side. If no key is requested, the negotiation mechanism checks to see if the secure link module has received a start key negotiation protocol indication from the secure link module's partner (step 515).

If the start key negotiation indication has been received from the secure link module's partner, the operation continues to step 520; otherwise the operation loops to step 510 and continues to check to see if key negotiation is required. Once either indication has occurred, the negotiation starts at step 520 by reading the active key indicator and setting the new transmit key indicator to the next key to be used. This allows the secure link module to continue to operate wile the next key is being negotiated. The operation continues by informing the secure link module's partner which receive key the partner should set (step 530). Then the negotiation mechanism of the secure link module waits for the partner to inform it what the local receive key is that it has set (step 535).

Next a key negotiation protocol is executed with the secure link module's partner (step 540). Any secure key negotiation protocol known to the art can be used. The first part of the key negotiation protocol decides which secure link module is the leader and which secure link module is the follower. Any technique known to the art can be used for leader election between the two secure link modules. At the end of this key negotiation protocol, two new keys K1 and K2 are generated. K1 and K2 are the same in both secure link modules. In this illustrative embodiment, a two way negotiation protocol is described and thus, these keys have not been passed over the link If a one-way negotiation protocol is used, the keys may be securely passed from one side to the other. As the final step of the key negotiation protocol, the leader assigns K1 to it's transmit key and K2 is placed in the local receive key indicated by its partner. The follower places K1 in the local receive key indicated by its partner and uses K2 as it's transmit key. (Consequently both secure link modules know which key is it's transmit and receive key at its side of the secure link, e.g., the transmit key for one side is the receive key for the other side and vice versa.) At this point, the operation sets the new local receive key as specified by the new receive key indicator received from the secure link module's partner and informs the partner that their receive key has been set (step 545). Next, the negotiation mechanism waits until it receives an indication that the partner has set their new receive key (step 550) based on the key indicator that was sent to it. Once this indication is received, it is known that the secure link module can safely start using the new transmit key by setting the new transmit key and then setting the current key indicator to indicate the new transmit key. The operation then waits for the new key to be used and finally clears the key request bit (step 555), thereby completing the key negotiation operation. It is worth noting that since the links are always actively sending frames, the secure link module has to only wait more than one packet time, typically 2 packet times, to assure that the new key is being used. This wait avoids a race condition on the key request bit. The key negotiation operation of FIG. 5 then starts checking for the next key request indication (step 510).

FIG. 6 is an example diagram of how two secure links are connected over an arbitrary fabric in accordance with one illustrative embodiment. From FIG. 3 one can see that multiple interconnect fabrics 370, 372, 374, 376, and 378 can be used. Each secure link module 390-394 has two parts, a transmit portion and a receive portion. The transmit portion of each secure link module 390-394 is connected to the receive portion of it partner secure link module 390-394 via one or more of the interconnect fabrics 370, 372, 374, 376, and 378. Taking secure link module 390 as representative of the secure link modules 390-394, the transmit portion or side of the secure link module 390 has two keys and two counters: transmit key one $TK_1$ 620 and its associated transmit counter one $T_{C_1}$ 625; and transmit key zero $TK_0$ 621 and its associated transmit counter zero $TC_0$ 623.

The transmit portion of the secure link module 390 also has the active key indicator AKI 641 and the key request bit KRB 642. The AKI 641 informs the transmit portion of the secure link module 390 which key to use, e.g., key zero $TK_0$ 621 or key one $TK_1$ 620. The AKI 641 is also placed in the frame so that the receiver knows which key to use to decrypt the frame. The KRB 642 is use to tell the key negotiation protocol that new keys need to be negotiated. Any policy can be used to decide that new keys are required, e.g., a count based policy; time based policy; a policy based on the number of errors detected; a combination of any of these policies; or the like. Whatever policy is used should guarantee that the frame number never repeats in the sequence while a particular key is being used. In one illustrative embodiment, the frame number 410 is a monotonically increasing counter.

The receive side of the secure link module 390 also has two keys and counters: receive key zero $RK_0$, receive counter zero $RC_0$, receive key one $RK_1$, and receive counter one $RC_1$. In addition there are two other counters, receive active one $RA_1$ and receive active zero $RA_0$. All of these keys and counters are used as a set $\{RK_0, RC_0, RA_0\}_0$ and $\{RK_1, RC_1, RA_1\}_1$ in the receive algorithm described hereafter with regard to FIG. 8. The Key Number 405 in the frame tells the receive algorithm which set of keys and counters to use. As has been previously pointed out, more than two sets of keys and counters can be used depending upon the desired implementation without departing from the spirit and scope of the illustrative embodiments.

FIG. 7 is an example flowchart outlining a transmit operation of a secure link module in accordance with one illustrative embodiment. The transmit loop starts by clearing the keys and counts, setting the AKI to a default start key, and setting the key request bit to force the establishment of the first real key (step 710). Since the receiver also sets its keys and counts to zero, this enables insecure (because the keys are known) communication between the transmitter and the receiver. Step 720 is the start of the main transmit loop. In step 720, the transmit operation selects a key and counter set based on the active key indicator AKI. The transmit operation increments the counter of the selected set and then copies the counter and AKI into the frame (step 730).

The transmit operation then proceeds by checking to see if the key is expiring (step 735). If the key is expiring, the transmit operation sets the Key request bit KRB 740 if not already set and proceeds to step 745. If the key is not expiring, the transmit operation proceeds directly to step 745 where the transmit operation checks to see if there are any data packets available. If there are data packets available, each packet will have a destination field 480 and associated data 482 (which may or may not include a source address). The packets will be packed into the frame until it is full, i.e. there is no room for the next packet. Those of ordinary skill in the art understand how to split data packets across frames. Once the next packet will not fill the frame, or there are no more packets available, the transmit operation fills the remainder of the frame with appropriate fill or null data (step 760). Returning to step 745, if there were no packets available, the entire frame is filled with fill or null data by proceeding directly to step 760.

The frame 420 is now full so the transmit operation appends the frame integrity 430 information (step 770) and then encrypts the frame and its integrity using the key indicated by the Key Number 405 in the frame and the frame number 410 in the frame (step 780). At this point the frame is passed to the interconnect fabric (step 790) which will add headers and trailers, or any other information required for transmission. After the frame is successfully passed to the interconnect fabric, the transmit operation returns to step 720 and starts building the next frame. This transmit operation continuously transmits frames to the partner. The frames will either contain data packets or fill/null data.

FIG. 8 is an example flowchart outlining a receive operation of a secure link module in accordance with one illustrative embodiment. As shown in FIG. 8, the receive operation starts by clearing all receive keys, counts, and active values ($RK_0$, $RC_0$, $RA_0$, $RK_1$, $RC_1$, and $RA_1$) to an initial value, e.g., zero (step 810). The receive operation then enters the main receive loop waiting for a frame from the interconnect fabric (step 815). If there is no frame, the receive operation continues to wait by returning to (step 815). If there is a frame, the receive operation checks to see if there was a interconnect fabric error (step 820). If an interconnect fabric error (for example CRC) is discovered, the frame is discarded (step 880) and the receive operation continues by waiting for the next frame (step 815).

If there was no interconnect fabric error, the receive operation checks to see that the counter is valid for the indicated key (step 830). In this illustrative embodiment, a monotonically increasing counter is used as the counter so that a check for a valid counter may be performed by extracting the Key number 405 from the frame and confirming that the frame number 410 in the frame is greater than the counter associated with the selected key. The value of the monotonically increasing counter may be based on a position of a corresponding frame in a fixed sequence or order of frames or may be independent of the fixed sequence or order of frames. In other illustrative embodiments, the receive operation can also check that the counter in the frame is greater than the active counter $RA_X$ for the indicated key. If a monotonically increasing counter is not used for the frame number, an appropriate mechanism is used to defend against the replay of an old frame. The purpose of checking the receive active counter RAx is to allow some parallelism between the receive portion and decryption portion of the receive operation.

If the frame number is invalid for any reason, the frame is discarded (step 880) and the algorithm proceeds to wait for the next frame (step 815). Otherwise, the receive operation sets the active count for the key indicated by the key number 405 to the frame number 410 in the frame and uses the key indicated by key number 405 in the frame, and the active count, to decrypt the block containing the data block 420 and integrity information 430 (step 843).

Next, the receive operation checks to see if the integrity information is valid for the data block 420 (step 845). If the integrity is not valid, the active count is cleared (step 870) and then the frame is discarded (step 880), at which point the receive operation waits for the next frame (step 810). Otherwise, if the integrity is valid, the receive count of the key set indicated by the key number in the frame is set to the active count indicated by the key number 405 from the frame (which is based on the frame number in the frame (step 850)) and then the receive operation passes the packets on to the switch or device controller 860 to which the secure link module 390 is attached. When an implementation allows packets to be split across frames, packet reassembly and/or discard of partial packets may also be done before the packets are passed to the switch or device controllers. Only complete packets will be passed to the switch or device controller. After the packets have been passed to the switch or device controller the receive operation waits for the next frame (step 815).

Thus, the illustrative embodiments provide mechanisms for providing a continuous stream of encrypted fixed length packets or frames across inter-chip links without having to modify the intra-chip fabric. The continuous stream of encrypted fixed length packets makes traffic based physical attacks ineffective for obtaining secure information. Thus, a more secure overall processor chip is obtained.

The illustrative embodiments are compatible with chip stacking technologies that are currently evolving. For example, the illustrative embodiments may be used to protect memory from probing attacks within a stacked IC. That is, the memory controller and the secure link modules of the illustrative embodiments may be combined into a new IC chip. With such a configuration, all information being passed between the CPU chip and the memory controller of the new IC chip is protected by the mechanisms of the illustrative embodiments. Standard memory chips may be stacked on top of this new IC chip and the I/O controller may be protected in a similar way. A tamper sensitive chip may be place on top of the memory stack with appropriate connections to the new IC chip in order to protect against tampering. Other ways in which the mechanisms of the illustrative embodiments may be used in stacked technologies may be used without departing from the spirit and scope of the illustrative embodiments.

It should be appreciated that the illustrative embodiments may take the form of an entirely hardware embodiment or an embodiment containing both hardware and software elements, e.g., software implemented in firmware for configuring the operation of hardware elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in an integrated circuit chip, for providing secure data communication links, the method comprising:
   initiating transmission of a continuous stream of frames across a data communication link, wherein the continuous stream of frames is a stream of frames in which each frame comprises data and there are no fixed timing interval breaks between frames in the continuous stream;
   determining, in a component of the integrated circuit chip, whether data is received from a source for transmission across the data communication link as part of the continuous stream of frames;
   in response to determining that data is received from the source for transmission across the data communication link, converting, by the component, the data to one or more first fixed length frames and transmitting, by the component, the one or more first fixed length frames on the data communication link as part of the continuous stream of frames; and
   in response to determining that data is not received to be transmitted across the data communication link, transmitting, by the component, as part of the continuous stream of frames, one or more second fixed length frames comprising fill data, for inclusion in the frames of the continuous stream, wherein the method is repeated continuously while the continuous stream is active such that the continuous stream comprises a combination of the one or more first fixed length frames in response to data being received from the source for transmission across the data communication link and the one or more second fixed length frames in response to data not being received from the source for transmission across the data communication link.

2. The method of claim 1, further comprising:
   associating a first sequence identifier with each first fixed length frame of the one or more first fixed length frames, each first sequence identifier being generated and associated with a corresponding first fixed length frame in accordance with a sequential order based on a position of the first fixed length frame within the sequential order.

3. The method of claim 2, further comprising:
   associating a second sequence identifier with each second fixed length frame of the one or more second fixed length frames, each second sequence identifier being generated and associated with a corresponding second fixed length frame in accordance with the sequential order based on a position of the second fixed length frame within the sequential order.

4. The method of claim 3, wherein the first sequence identifier and the second sequence identifier are non-repeating frame identifiers generated in accordance with the sequential order.

5. The method of claim 4, wherein the non-repeating frame identifiers are frame numbers generated according to the sequential order being a monotonically increasing counter.

6. The method of claim 1, wherein each fixed length frame of the one or more first fixed length frames and the one or more second fixed length frames comprise an integrity value, and wherein the integrity value is generated by the component of the integrated circuit chip and encrypted with data of an associated fixed length frame into a single encrypted block of data by the component.

7. The method of claim 1, wherein each fixed length frame of the one or more first fixed length frames and the one or more second fixed length frames has a non-repeating frame number and encrypted data.

8. The method of claim 7, wherein, for the one or more first fixed length frames, the encrypted data is a portion of the received data to be transmitted across an inter-chip data communication link, and wherein, for the one or more second fixed length frames, the encrypted data is dummy data.

9. The method of claim 7, wherein the encrypted data is encrypted based on a combination of the non-repeating frame number and a key value associated with the fixed length frame.

10. The method of claim 9, wherein the key value is generated using a secured key negotiation protocol initiated by the component with a partner component at a target receiver of the fixed length frame, the secured key negotiation protocol being configured to provide negotiation in a manner that the key value is not compromised during negotiation.

11. The method of claim 1, wherein each fixed length frame of the one or more first fixed length frames and the one or more second fixed length frames comprises a key identifier, a monotonically increasing counter value, one or more data packets each with a destination address, and an integrity value for a data block comprising data of the one or more data packets in the fixed length frame, and wherein the data of the one or more data packets and the integrity value are encrypted together within the fixed length frame.

12. The method of claim 1, wherein the component of the integrated circuit chip is a secure link module of the integrated circuit chip associated with a communication controller for controlling communication over the data communication link.

13. The method of claim 12, wherein the data communication link is one of a memory controller fabric, an input/output controller fabric, or an inter-chip communication link.

14. A computer program product comprising a non-transitory computer readable medium having a computer readable program recorded thereon, wherein the computer readable program, when executed on a component of a computing device, causes the component to:
    initiate transmission of a continuous stream of frames across a data communication link, wherein the continuous stream of frames is a stream of frames in which each frame comprises data and there are no fixed timing interval breaks between frames in the continuous stream;
    determine whether data is received from a source for transmission across the data communication link as part of the continuous stream of frames;
    convert the data to one or more first fixed length frames and transmit the one or more first fixed length frames on the data communication link as part of the continuous stream of frames in response to determining that data is received from the source for transmission across the data communication link; and
    transmit, as part of the continuous stream of frames, one or more second fixed length frames comprising fill data, for inclusion in the frames of the continuous stream in response to determining that data is not received from the source for transmission across the data communication link as part of the continuous stream, wherein the component continuously performs the determine, convert, and transmit operations while the continuous stream is active such that the continuous stream comprises a combination of the one or more first fixed length frames in response to data being received from the source for transmission across the data communication link and the one or more second fixed length frames in response to data not being received from the source for transmission across the data communication link.

15. The computer program product of claim 14, further comprising:
    associating a first sequence identifier with each first fixed length frame of the one or more first fixed length frames, each first sequence identifier being generated and associated with a corresponding first fixed length frame in accordance with a sequential order based on a position of the first fixed length frame within the sequential order; and
    associating a second sequence identifier with each second fixed length frame of the one or more second fixed length frames, each second sequence identifier being generated and associated with a corresponding second fixed length frame in accordance with the sequential order based on a position of the second fixed length frame within the sequential order.

16. The computer program product of claim 15, wherein the first sequence identifier and the second sequence identifier are non-repeating frame identifiers generated in accordance with the sequential order.

17. The computer program product of claim 16, wherein the non-repeating frame identifiers are frame numbers generated according to the sequential order being a monotonically increasing counter.

18. The computer program product of claim 14, wherein each fixed length frame of the one or more first fixed length frames and the one or more second fixed length frames comprise an integrity value, and wherein the integrity value is generated by the component of the integrated circuit chip and encrypted with data of an associated fixed length frame into a single encrypted block of data by the component.

19. The computer program product of claim 18, wherein, for the one or more first fixed length frames, the encrypted data is a portion of the received data to be transmitted across an inter-chip data communication link, and wherein, for the one or more second fixed length frames, the encrypted data is dummy data.

20. The method of claim 1, wherein each first fixed length frame has a same first fixed length and each second fixed length frame has a same second fixed length.

21. The method of claim 20, wherein the first fixed length and the second fixed length are the same.

22. The method of claim 1, wherein the data communication link is an inter-chip data communication link configured to communicate data between a plurality of chips of a same multi-chip data processing device, and wherein the continuous stream of frames is a continuous stream of frames being sent between a first processor chip of the multi-chip data processing device to at least one second processor chip of the multi-chip data processing device.

* * * * *